United States Patent Office 3,019,235
Patented Jan. 30, 1962

3,019,235
12β,13β-METHANO-18-NORSTEROIDS
Vlasios Georgian, Belmont, Mass., James F. Kerwin, Broomall, Pa., and Manfred E. Wolff, San Bruno, Calif., assignors to Smith Kline & French Laboratories, Philadelphia, Pa., a corporation of Pennsylvania
No Drawing. Filed Jan. 10, 1961, Ser. No. 81,705
11 Claims. (Cl. 260—397.3)

This invention relates to novel 12β,13β-methano-18-norsteroids and the novel intermediates and process for their preparation. The 12β,13β-methano-18-norsteroids of this invention are useful hormonal and cortical agents. More specifically the novel compounds of this invention are the 12β,13β-methano-18-nor analogues of the well-known steroidal agent 11-dehydrocorticosterone.

The 12β,13β-methano-18-norsteroids and the process for their preparation are represented by the following scheme:

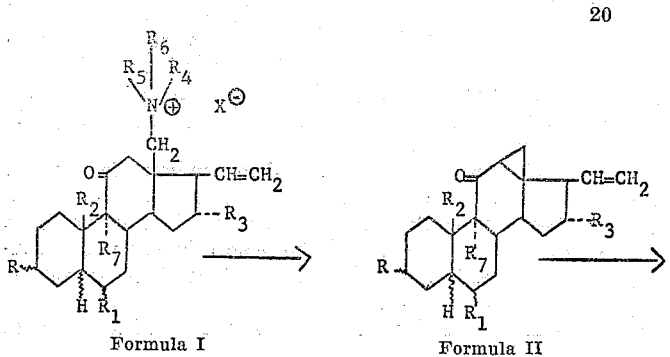

Formula I      Formula II

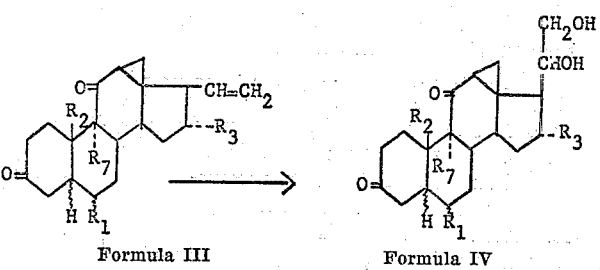

Formula III      Formula IV

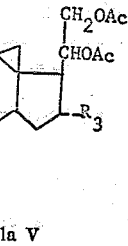

Formula V when:

$\xi$ represents α or β;
R represents hydroxy or keto;
$R_1$ represents hydrogen, methyl or fluoro, preferably α;
$R_2$ represents hydrogen or methyl;
$R_3$ represents hydrogen or methyl;
$R_4$, $R_5$ and $R_6$ represent lower alkyl of 1–4 carbon atoms inclusive, preferably methyl;
$R_7$ represents hydrogen or fluoro;
X represents an anion, preferably an inorganic anion, such as halide, for instance, iodide, chloride or bromide, methosulfate, sulfate or p-toluenesulfonate, which forms a stable quaternary salt; and Ac represents an acyl group derived from a hydrocarbon carboxylic acid of less than 7 carbon atoms, preferably acetyl.

The 18-trialkylammonium salt starting materials of Formula I are readily obtained from the corresponding conanine derivatives of the following formula:

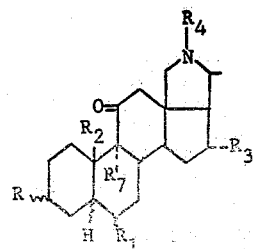

Formula VI when the substituents are as defined above. The conanines themselves are either known or are prepared from 20-keto compounds with free $C_{18}$ groups having any desired configuration or substitution in the steroidal nucleus. These 20-keto compounds are reacted as disclosed in copending application Serial No. 821,348 filed June 19, 1959, now Pat. No. 2,983,736, with an excess of a primary lower alkylamine under mild hydrogenation conditions using platinum oxide catalyst. The resulting 20-monoalkylamine is treated as disclosed in copending application Serial No. 843,334 filed September 30, 1959 with a halogenating agent, such as N-chlorosuccinimide, to give the 20-(N-haloamine) which is, in turn, irradiated with ultraviolet light in the presence of trifluoroacetic acid to give the desired base of the starting material, an N-alkyl conanine derivative. The conanine is converted into a quaternary derivative usually with a reactive alkyl halide, such as a lower alkyl iodide, preferably the methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until the halide ion is exhausted. More specifically, the quaternary halide salt of the conanine of Formula VI dissolved in an organic solvent in which it is soluble and nonreactive such as the preferred lower alkyl alcohols, for instance methanol or ethanol, is reacted with an excess of the hydroxide form of an anion exchange resin. Exemplary of the resins (halide form) which can be used are the preferred Amberlite IRA-400, as well as Amberlite IRA-401, Amberlite IRA-410, Amberlite IRA-411, Dowex 1, Dowex 2, Imac S-3 and others. Full descriptions of these resins, including what is known of their sources and chemical characteristics are found in "Ion Exchange Resins" by Kunin, 2nd edition, John Wiley, pages 89-96 and "Ion Exchangers in Organic and Biochemistry" by Calmon and Kressman, Inter-science, pages 116-129. Exemplary of the preparation of the anion exchange resins used are those disclosed by U.S. Patents No. 2,591,573, No. 2,689,833, No. 2,689,832 and No. 2,725,361, particularly those of the example of No. 2,591,573 and Example 1 of No. 2,689,833.

The chemical structures of the anion exchange resins detailed above can vary widely. The anion exchange resins may be considered as insoluble, high molecular weight electrolytes. The resin must be sufficiently crosslinked to have negligible solubility, sufficiently hydrophilic to permit diffusion of ions through the structure at a finite and usable rate and chemically stable. The most useful are the strongly basic exchangers of a Type 1 resin containing —NMe$_3$⊕ groups which have a skeleton derived from a monomer of p-trimethylaminomethylphenylethylene. Otherwise stated, these resins are the hydroxide forms of styrene-type quaternary salts.

The preferred manner of reaction is to pass the quaternary steroid in alcoholic solution over the hydroxide form of the resin in a typical column form, washing the resin with more solvent until the eluate is neutral. The alcohol is then evaporated to leave the steroidal quaternary hydroxide of the conanine of Formula VI.

This conanine quaternary hydroxide, prepared as described above, is then heated, preferably under vacuum, until the effervescence ceases. The heating period is carried out advantageously from about 150–250° C. at low vacuum, such as from about 5–200 mm. pressure. Preferred conditions are at about 180° C. under about 10–50 mm. pressure. The reaction time is usually about two-to-three minutes to four hours, preferably about 10 minutes to about one hour. The residue is then a crude 18-dialkylamino-$\Delta^{20}$-steroid which is quaternized by reaction with a reactive lower alkyl halide in an organic, usually highly polar, solvent in which the reactants are substantially soluble and nonreactive, such as acetonitrile, ethanol, methanol, benzene, dimethylformamide or dimethylacetamide, at temperatures of from about 50–150° C. for 1 to 24 hours, preferably in acetonitrile at reflux, to give the 18-trialkylammonium salt starting material of Formula I.

The 18-trialkylammonium salt of Formula I, prepared as described above, is then converted to the 12$\beta$,13$\beta$-methano-18-nor-20-pregnenes of Formula II which are important intermediates of this invention. The quaternary salt starting material is reacted with an excess of an alkaline reagent in a polar organic solvent, in which the reactants are substantially soluble and with which are unreactive. The solvent employed is advantageously strongly ionizing such as the simple liquid formamides and acetamides as well as their N-loweralkyl derivatives having one or two N-alkyl substituents of from 1 to 4 carbon atoms, acetonitrile or a lower alkyl alcohol such as methanol or ethanol. The preferred solvents are anhydrous N,N-dimethylformamide and N,N-dimethylacetamide.

Exemplary of suitable alkaline reagents are the alkali metal lower alkoxides of up to 6 carbon atoms especially sodium methoxide, sodium ethoxide, sodium tert.-butoxide and their potassium analogues, the alkali metal amides especially sodium amide, lithium amide or potassium amide, the alkali metal hydrides especially lithium hydride or sodium hydride or the alkali metal hydroxides such as sodium or potassium hydroxide. The alkali metal lower alkoxides are preferred.

The reaction is run at temperatures of from about 50–250° C. preferably from about 75–175° C. but of course not exceeding the boiling point of the solvent employed. The reaction proceeds rapidly after being essentially complete within 1–3 hours. Usual reaction time is from about 5 to 60 minutes. Temperatures and reaction times outside of these ranges afford little advantage.

When the reaction is run as described above the 18-trialkylammonium cation is cleaved with the resultant formation of a 12$\beta$,13$\beta$-methano moiety as shown in Formula II. This novel reaction is independent of configuration and substituents other than at the 11 and 18 positions, particularly in the A,B rings of the steroid nucleus. Therefore any substituents stable under the alkaline conditions employed in the reaction may be present. Starting materials having a 3-acyloxy moiety for instance can be used but usually are hydrolyzed to the 3-hydroxy congener during the reaction.

The reaction sequence is then continued in order to oxygenate the 20,21-positions. The 12$\beta$,13$\beta$-methano-20-pregnen-3-ols of Formula II, when R is hydroxyl, are oxidized preferably using chromic acid in virtually neutral (acetone), acidic (acetic acid) or basic (pyridine) solutions usually at room temperature under standard conditions to give the 3-keto analogues. Note that when R is keto this oxidation step is of course unnecessary.

The 3-keto compounds are then oxygenated at the 20,21-positions by suitable oxidation methods. Preferably the oxidation is carried out by reaction at moderate temperatures such as from about 25–50° C. for about 10–48 hours with at least stoichiometric quantities of osmium tetroxide, and preferably an excess, in an anhydrous organic solvent unreactive with the reactants and in which the reactants are substantially soluble such as a preferred ethereal solvent for example diethyl ether, tetrafuran, dioxane etc. Reaction conditions other than those outlined have been found to give little further advantage. The resulting osmium esters are decomposed during the work-up of the reaction mixture such as by ethanolic sodium sulfite to give the desired 12$\beta$,13$\beta$-methanopregnan-20,21-diols (IV). Alternative oxidation reagents are osmium tetroxide plus organic iodoso compounds (Canadian Patent No. 567,479), potassium permanganate in pyridine or osmium tetroxide-potassium perchlorate. Many of these reagents are less desirable because of degradation of other parts of the steroid nucleus due to side oxidation reactions.

The diols are optionally acylated if it is desired to protect the diol moiety, usually by using an excess of an alkanoyl halide or anhydride of up to 7 carbon atoms, preferably acetic anhydride, with tertiary base usually in liquid tertiary base as pyridine at room temperature or with slight warming such as about 25–100° C. In certain cases a diluent can be used such as ether, ethyl acetate etc. The pyridine solution is quenched in water to give the diacyl products (V).

The diols (IV) or the diacylated 12$\beta$,13$\beta$-methanopregnan-20,21-diols (V) are converted into useful cortical products which are 11-dehydrocorticosterone analogues such as the novel 12β,13β-methano-4-pregnen-3,11,20-trione-21-ols and their acyl derivatives as follows:

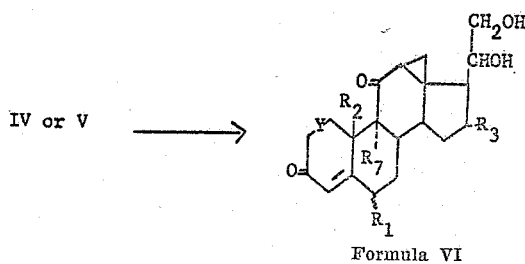

Formula VI

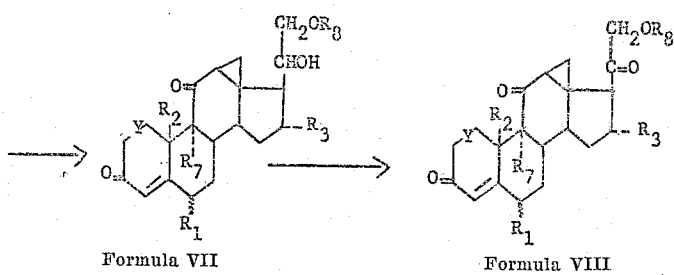

Formula VII          Formula VIII in which the substituents $R_1$, $R_2$, $R_3$ and $R_7$ are as described above for Formulas I-V; Y is either an ethylene (—$CH_2$—$CH_2$—) bond or a vinylene (—CH=CH—) bond; when $R_2$ is hydrogen, Y is necessarily ethylene; and $R_8$ is an acyl group derived from a hydrocarbon carboxylic acid of less than 7 carbon atoms, preferably acetyl, or a triphenylmethyl group.

The diols (IV) or the diacylated 12β,13β-methano-pregnan-20,21-diol-3,11-diones (V) are reacted with bromine in acetic acid solution at ambient temperatures to form the 2,4-dibromo derivatives in the allopregnane series or 4-bromo in the pregnane series which are debrominated by consecutive reaction with sodium iodide and hydriodic acid, reaction with collidine or reaction with semicarbazide followed by hydrolysis of the 3-semicarbazone. These are standard methods of introducing the double bonds into the steroid nucleus and give the diols (VI) or the corresponding diacylated 12β,13β-methano-4-pregnen-20,21-diol-3,11-diones. The latter compounds are deacylated by mild hydrolysis such as with an alkali metal carbonate or bicarbonate in aqueous methanol or ethanol to the diols (VI). The resulting compounds are then monoacylated at the 21-hydroxy group using about one equivalent of an acylating agent such as an acyl anhydride or chloride in the presence of a tertiary base such as pyridine either in large excess of the base or with smaller amounts of base in a diluting solvent such as ethyl acetate, dioxane, ether etc. The acylation usually is run at moderate temperatures such as about 25° C. for from 4 to 60 hours. Alternatively the 21-hydroxy group is selectively etherified with chlorotriphenylmethane in pyridine solution to give the triphenylmethyl ether. The resulting 21-acylates or 21-triphenylmethyl ethers are then oxidized at the 20-position, such as by using chromic acid in acid solution usually in acetic acid, to give the desired 21-acyloxy- or 21-triphenylmethoxy-12β,13β - methano - 4 - pregnen - 3,11,20 - trion - 21 - ols (VIII). If desired, the free alcohol compounds are obtained by simple mild hydrolysis such as by using an alkali carbonate or a dilute acid in aqueous methanol or ethanol.

The $\Delta^{1,2}$ double bond indicated by the symbol Y above is introduced into the moiety either by dehydrohalogenating the 2,4-dibromo intermediate obtained by brominating the 12β,13β-methano-pregnan-21,21-diol-3,11-diones or diacylates using an excess of collidine or by treating these compounds with selenium dioxide in acetic acid-tert. butanol. The remainder of the reactions, VI→VIII are as described above. Of course the $\Delta^1$ compounds in the 19-nor series cannot be prepared because of aromatization.

In the above description the terms "pregnane" or "pregnene" are used generically to include the corresponding allo or 19-norpregnane structures as well as the normal series. The term "conanine" is used to define steroidal compounds which are pyrrolidine derivatives closed at the 18,20-positions having 20α or 20β as well as 5α or 5β configurations as well as N-lower alkyl substituents thereof. "Lower alkyl" is used to define alkyl moieties having 1 to 4 carbon atoms inclusive, preferably methyl. "Alkali metal" means any member of the metallic group usually included in this classification according to definition but with sodium and potassium preferred. The term "ethereal" when applied to a solvent means any saturated solvent possessing one or more ether linkages having a carbon maximum of 6 carbon atoms.

The definitions described hereinbefore have been limited for purposes of simplification. For instance, the halogen substituents in $R_1$ and $R_7$ are described as "fluoro" but bromo and chloro atoms could be substituted therefor. Also for instance the substituents at position 6 could be β as well as α to the ring. The 6 β-substituents are isomerized to the 6α-position by exposure to base or acid. Reduction of the $\Delta^4$-progesterones used as a starting material also gives mixtures of allo and normal pregnanes, mostly allo.

The configuration of the A,B rings as is evident from the above description is immaterial since a $\Delta^4$ unsaturated system is usually formed giving the same product from either a pregnane or allopregnane compound. Actually the 3β-hydroxyallopregnane structure arise from the conanines while 3α-hydroxypregnanes arise from the 5β-conanines. These two preferred structures are more readily available as starting material.

For the purpose of simplification, the disclosure has been limited to the basic reactions and compounds necessary to practice this invention. Other specific details obvious to one skilled in the art will be even more readily apparent from the following examples. Of course variations and different sequences of reaction will be apparent to one skilled in the art but the overall basic reaction sequences described are only exemplary. All isomers not specifically mentioned but covered in the general structural formulas and names are meant to be included in this invention.

Example 1

The conanine derivatives of Formula VI used to prepare the 18-trialkylammonium salts of Formula I are obtained from 20-alkylamino steroids which are in turn obtained from 20-keto steroids. These processes are disclosed in copending applications Serial No. 821,348 filed June 19, 1959 and Serial No. 843,334 filed September 30, 1959, and are generally outlined in the above description. The following example will serve to give a specific preparation of a conanine derivative according to the processes of the above identified copending applications.

A solution of 100 g. of $3\beta$ - hydroxy - 11,20 - allopregnandione in 1 l. of absolute alcohol containing an excess of methylamine is allowed to stand at room temperature for one hour. Platinum oxide (3.0 g.) is added and the mixture is shaken with hydrogen at atmospheric pressure until one mole of hydrogen is absorbed. The catalyst is removed by filtration and the filtrate is taken to dryness in vacuo. The solid syrup obtained is suspended in acetone and filtered. The solid is dissolved in glacial acetic acid, diluted with a large volume of water and extracted with ether. The aqueous layer is adjusted to pH 11 with 40% sodium hydroxide solution. The solid which precipitates is filtered and dried in vacuo over phosphorus pentoxide. The pure product $3\beta$-hydroxy-20-methylamino-11-allopregnanone is obtained by recrystallization from toluene, M.P. 187–189° C. $[\alpha]_D^{25}=55.9°$ ($c=1.00$ in chloroform). A solution of 12.1 g. of $3\beta$-hydroxy-20-methylamino-11-allopregnanone in 600 ml. of methylene chloride is stirred with 600 ml. of 5% sodium hypochlorite solution for one hour, when the hpyochlorite is removed and the treatment is repeated. The chloroform layer is separated, washed with water, dried and evaporated to yield 13.3 g. of colorless solid, $3\beta$ - hydroxy - 20 - (N - methyl - N - chloroamino)-11-allopregnanone.

The N-chloroamine is dissolved in 130 ml. of redistilled trifluoroacetic acid and subjected to ultraviolet irradiation under nitrogen atmosphere for 40 minutes. The trifluoroacetic acid is evaporated in vacuo and the residual $3\beta$-hydroxy-18-chloro - 20 - methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is $3\beta$-hydroxy-11-ketoconanine.

Example 2

A solution of 2.61 g. of $3\beta$-hydroxy-11-ketoconanine and 4.0 ml. of methyl iodide in 30 ml. of benzene is heated at reflux for two hours. The mixture is cooled, diluted with ether and the resulting solid separated to give $3\beta$-hydroxy - 11 - ketoconanine methiodide, M.P. >285° C., $[\alpha]_D^{25}+49°$ in methanol.

A solution of 3.7 g. of the methiodide dissolved in 50 ml. of methanol is passed through a column of 12.3 g. of Amberlite IRA–400 resin (hydroxide form). The resin column is washed with methanol until the eluate is neutral. The combined methanol solutions are evaporated to leave the quaternary hydroxide.

This residue is heated at 170° C. under 15 mm. pressure until the effervescence ceases. The residue is recrystallized from methanol, to give $3\beta$-hydroxy-11-keto-18-dimethylamino-20-allopregnene, M.P. 132–133.5° C., $[\alpha]_D^{25}+34°$ (chloroform). This olefin (750 mg.) and 4 ml. of methyl iodide is heated in acetonitride for 18 hours to give a residue of $3\beta$-hydroxy-11-keto-18-trimethylammonium-20-allopregnene iodide, M.P. 228–229° C., $[\alpha]_D^{25}+42°$ (methanol).

A solution of 3.0 g. of $3\beta$-hydroxy-11-keto-18-trimethylammonium-20-allopregnene iodide is dissolved in 40 ml. of dimethylforamide, treated with 4.0 g. of sodium methoxide and heated to reflux for 10 minutes. After heating at 95° C. for 30 minutes, the reaction mixture is cooled, poured into water and extracted with ether. From evaporation of the ether there is obtained $3\beta$-hydroxy - 11 - keto-$12\beta$,$13\beta$-methano-18-nor-20-allopregnene, M.P. 128–129.5° C., $[\alpha]_D^{25}—3$.

This compound (300 mg.) in 5 ml. of acetone is treated with 0.28 ml. of 4 M chromic acid solution. The mixture is quenched in 50 ml. of water and several ml. of ethanol then chilled to give white crystals of 3,11-diketo-$12\beta$,$13\beta$-methano-18-nor-20-allopregnene.

A mixture of 3.5 g. of the allopregnendione, 3 g. of osmium tetroxide and 200 ml. of absolute ether is reacted for 48 hours. The black osmium ester is suspended in 300 ml. of 60% aqueous ethanol containing 24 g. of sodium sulfite, refluxed for 4 hours and filtered. The filtrate is evaporated and the residue stirred with methylene chloride. The extract is washed with water dried and evaporated to give, after recrystallization from ethyl acetate, 3,11-diketo-$12\beta$,$13\beta$-methano-18-nor-allopregnan-20,21-diol.

A solution of 900 mg. of the diol, 2 ml. of acetic anhydride and 2 ml. of pyridine is heated at 90° C. for 30 minutes. The solution is quenched in water, filtered and the resulting solid recrystallized from methanol to give the diacetate.

Example 3

$3\alpha$-hydroxy-$16\alpha$-methyl-11-keto-$5\beta$-conanine (2 g.) is converted into the hydroxide as in Example 2. This is heated at 175° C. at 15 mm. until the evolution of bubbles ceases. The resulting $3\alpha$-hydroxy-$16\alpha$-methyl-11-keto-18-dimethylamino-20-pregnene is quaternized to the iodide and then heated with 2.5 g. of sodium methoxide as in Example 2 to give $3\alpha$-hydroxy-$16\alpha$-methyl-11-keto-$12\beta$,$13\beta$-methano-18-nor-20-pregnene. This compound is oxidized with chromic acid solution to give the 3-ketone. A mixture of 6.9 g. of this compound, 6 g. of osmium tetroxide and 500 ml. of ether is reacted for 48 hours. The osmium ester is decomposed by refluxing in 500 ml. of aqueous alcohol containing 36 g. of sodium sulfite to give 3,11-diketo-$16\alpha$-methyl-$12\beta$,$13\beta$-methano-18-norpregnen-20,21-diol which is acetylated (4.2 g.) with 3 ml. of acetic anhydride in 20 ml. of pyridine to give the 20,21-diacetate.

Example 4

$3\alpha$-hydroxy-11-keto-$5\beta$-conanine, obtained by hydrolysis from 1.3 g. of $3\alpha$-acetoxy-11-keto-$5\beta$-conanine is reacted with 2 ml. of methyl iodide in 100 ml. of benzene at reflux for three hours. After dilution with ether the separated quaternary salt is isolated by filtration (M.P. >200° C.) and dissolved in methanol for exchanging with hydroxide ion on Amberlite IRA–400. The quaternary hydroxide is heated at 190° C. at 25 mm. pressure to form the $3\alpha$-hydroxy-11-keto-18-dimethylamino-20-pregnene, M.P. 132–134° C. The olefin (800 mg.) is quaternized with methyl iodide to give the corresponding salt (M.P. 225–227° C. dec.) which is then heated in 20 ml. of dimethylformamide with 1.0 g. of sodium methoxide at 100° C. for 30 minutes to give $3\alpha$-hydroxy-11-keto-$12\beta$,$13\beta$-methano-18-nor-20-pregnene.

This compound (3.0 g.) is oxidized with an acetone solution with 2.8 ml. of 4 M chromic acid solution to give, after quenching, 3,11-diketo-$12\beta$,$13\beta$-methano-18-nor-20-pregnene, M.P. 140–142.5° C. The olefin (1.6 g.), 1.5 g. of osmium tetroxide and 100 ml. of ether is reacted for 24 hours to give, after decomposing the osmium ester, 3,11-diketo-$12\beta$,$13\beta$-methano-18-norpregnan-20,21-diol, M.P. 151–155° C. Acetylation of the diol (1.3 g.) with an excess of acetic anhydride in pyridine gives the diacetate.

Example 5

A solution of 2 g. of $3\alpha$-hydroxy-11-keto-$5\beta$-conanine, prepared by hydrolyzing $3\alpha$-acetoxy-11-keto-$5\beta$-conanine with methanolic sodium hydroxide, in 100 ml. of pyridine is reacted with 2 g. of chromium trioxide by heating briefly on the steam bath and standing at room temperature overnight. The mixture is quenched to separate the desired 3,11-diketo-5β-conanine.

The conanine (1.5 g.) is converted into the methiodide and the quaternary hydroxide as in Example 2. This residue is heated at 180° C. under 20 mm. pressure until effervescence stops to give the 17-olefin. This compound (1.1 g.) is converted into the methiodide as in Example 2 and then heated at 95° C. for 30 minutes in dimethylformamide solution with sodium methoxide to give 3,11-diketo-12β,13β-methano-18-nor-20-pregnene, which is identical with that formed in Example 4.

*Example 6*

A solution of 3 g. of 3β-hydroxy-6α-fluoro-11-ketoconanine is reacted with 4.5 g. of methyl bromide in 50 ml. of benzene at reflux for 5 hours. The methobromide separates as a solid and is collected by filtration. The methiodide (2.5 g.) dissolved in methanol (100 ml.) is passed over a column containing IRA–400 resin (hydroxide form). The methanolic eluate is evaporated and the oily residue is heated to 185° C. on an oil bath. After evolution of gas is complete, the desired 3β-hydroxy-6α-fluoro-11-keto-18-dimethylamino - 20 - allopregnene remains. This compound (2 g.) is quaternized to the ethobromide by heating with 20 ml. of ethyl bromide in acetonitrile for 12 hours.

A solution of the above ethobromide (1.0 g.) in dimethylformamide is heated at 95° C. with 1.5 g. of sodium methoxide for 30 minutes to give 3β-hydroxy-6α-fluoro-11-keto-12β,13β-methano-18-nor-20-allopregnene.

This pregnenol (0.6 g.) in 15 ml. of acetone is oxidized with 0.60 ml. of standardized 4 M chromic acid solution. The mixture is poured into water-ethanol and chilled to give the 3-keto compound.

A mixture of 1.5 g. of 3,11-diketo-6α-fluoro-12β,13β-methano-18-nor-20-allopregnene and 2 g. of osmium tetroxide in 200 ml. of absolute dioxane is held at 50° C. for 24 hours. The mixture is filtered. The osmium ether is refluxed in a suspension of 12 g. of sodium sulfite in 150 ml. of aqueous methanol for 6 hours. The filtrate is evaporated to dryness and the residue taken through methylene chloride to give 3,11-diketo-6α-fluoro-12β,13β-methano-18-nor-allopregnan-20,21-diol. The diol (0.8 g.) is acylated with 2 ml. of propionic anhydride in pyridine at room temperature overnight. After quenching the dipropionate ester is obtained.

*Example 7*

3β-hydroxy-9α-fluoro-11-ketoconanine (3.0 g.) is reacted with 2 ml. of methyl iodide in 300 ml. of benzene at reflux for three hours. The resulting methiodide in methanol is passed over an Amberlite IRA–400 column, hydroxide form. The residue from the methanolic eluate is heated at 190° C. at 25 mm. until gas formation stops to give 3β-hydroxy-9α-fluoro-11-keto-18-dimethylamino-20-allopregnene. This compound (1 g.) is quaternized with methyl iodide in acetonitrile. A solution of the quaternary salt (1.0 g.) in dimethylformamide is heated at 95° C. for 30 minutes with 1.5 g. of sodium methoxide to give 3β-hydroxy-9α-fluoro-11-keto-12β,13β-methano-18-nor-20-allopregnene. This compound (3.0 g.) is oxidized with 2.8 ml. of chromic acid solution in acetone. After quenching, the 3-ketone is obtained and a mixture of 1.8 g. of the ketone, 1.5 g. of osmium tetroxide and 150 ml. of ether is reacted for 48 hours. The osmium ester is decomposed by sodium sulfite in methanol to give 3,11-diketo-9α-fluoro-12β,13β - methano-18-nor-allopregnan-20,21-diol. This compound is acylated with an excess of acetic anhydride in pyridine to give the diacetate.

*Example 8*

A solution of 20 g. of 19-nor-4-pregnen-3,11β-diol-20-one (U.S. Patent No. 2,878,267) in 250 ml. of methanol with 2 g. of 5% palladium-on-charcoal is hydrogenated at low pressure and room temperature until one mole equivalent of hydrogen is absorbed. The catalyst is removed and the filtrate evaporated to give 19-norallopregnan-3β,11β-diol-20-one which is converted to the 3-acetate by treatment with one mole of acetic anhydride in pyridine. This compound (18 g.) is taken up in 250 ml. of ethanol containing 15 g. of butylamine and allowed to stand for five hours. The clear solution is shaken with 1 g. of platinum oxide catalyst at 50 p.s.i. of hydrogen. When one mole equivalent of hydrogen is absorbed, the catalyst and alcohol are removed. The residue is taken through acid-ether treatment. The acid extracts are neutralized and extracted with ether. The ether extracts are washed with salt solution dried and evaporated to yield the acetate of 19-nor-20-butylaminopregnan-3β,11β-diol. A mixture of 15 g. of the secondary amine in acetic acid is reacted slowly with chromic acid in acetic acid solution and the mixture is quenched in water. This 11-keto compound (6 g.) in 350 ml. of chloroform is stirred with 350 ml. of 5% sodium hypochlorite solution for two hours. The chloroform layer is removed and worked up to give the N-chloroamine. A solution of 7 g. of the N-chloroamine in 75 ml. of trifluoroacetic acid is irradiated for 60 minutes. The solvent is evaporated to leave the crude 18-chloro compound which is taken up to 100 ml. of methanol and made strongly basic with 25% methanolic potassium hydroxide. After a reflux period of 8 hours, the mixture is evaporated, poured into water and taken through chloroform to give the crude N-butyl-19-nor-3β-hydroxy-11-ketoconanine.

A mixture of 5 g. of the conanine and 7 ml. of butyl iodide in benzene is refluxed for 6 hours to give the quaternary salt which is taken up in methanol and passed over a hydroxide resin as described above to give the quaternary hydroxide. The hydroxide is heated at 185° C. under 15 mm. pressure until effervescence stops to form 3β-hydroxy-11-keto-18-dibutylamino-19-nor-20-allopregnene. This compound (5 g.) is reacted with 5 g. of ethyl bromide in acetonitrile to form the quaternary ethobromide.

The ethobromide (5 g.) in 50 ml. of dimethylformamide with 5 g. of potassium methoxide is heated at 95° C. for 30 minutes to give 3β-hydroxy-11-keto-12β,13β-methano-18,19-bisnor-20-allopregnene.

The allopregnene (3.6 g.) in 100 ml. of acetone is treated with 3.5 ml. of 4 M chromic acid solution. Quenching gives 3,11-diketo-12β,13β-methano-18,19-bisnor-20-allopregnene. This compound (3.2 g.), 3 g. of osmium tetroxide and 250 ml. of absolute ether is reacted for 36 hours. The ester is refluxed in 350 ml. of sodium sulfite solution for 5 hours. The reaction filtrate is evaporated and the residue extracted into methylene chloride to yield 3,11-diketo-12β,13β-methano-18,19-bisnor-allopregnan-20,21-diol. The diol (1.8 g.) is acetylated with 5 ml. of acetic anhydride in 10 ml. of pyridine to give 3,11-diketo-12β,13β-methano-18,19 - bisnor-allopregnan-20,21-diol diacetate.

Substituting 6α-fluoro-19-nor - allopregnan-3β-ol-11,20-dione (prepared as described in U.S. 2,838,492) in the amination and cyclization reactions as above to form 6α-fluoro-19-nor-3β-hydroxy-11-ketoconanine and thence in the reactions as described the following compounds are prepared: 3β-hydroxyl - 11 - keto-6α-fluoro-12β,13β-methano-18,19 - bisnor-20-allopregnene; 3,11-diketo-6α-fluoro-12β,13β-methano-18,19-bisnor - 20 - allopregnene; 3,11-diketo-6α-fluoro - 12β,13β - methano-18,19-bisnor-allopregnan-20,21-diol; and its diacetate.

*Example 9*

A mixture of 6 g. of 6β,9α-difluoro-3β-hydroxy-11-ketoconanine and 7 ml. of methyl iodide in benzene is refluxed for two hours to give the methiodide which is exchanged over a hydroxide onion exchange column as described before to give the quaternary hydroxide. This compound is heated to 170° C. under 10 mm. pressure to give the olefin which is requaternized with methyl iodide in acetonitrile to give 3β-hydroxy-6β,9α-difluoro-11-keto-18-dimethylamino-20-allopregnene methiodide.

A mixture of 7 g. of the methiodide in 75 ml. of dimethylformamide with 5 g. of sodium methoxide is heated at 95% C. for 30 minutes. Quenching gives the desired 3β-hydroxy-6β, 9α-difluoro-11-keto-12β, 13β-methano-18-nor-20-allopregnene. This compound (4.5 g.) is oxidized with chromic acid in acetone solution to give the 3-one which (3.5 g.) is oxidized with 3.0 g. of osmium tetroxide in 350 ml. of ether at 50° C. The osmium ester is decomposed with 400 ml. of sodium sulfite solution at reflux. After methylene chloride extraction of the residue, the desired 3,11-diketo-6β,9α-difluoro-12β,13β-methano-18-nor-allopregnan-20,21-diol is obtained. This diol residue is acetylated with an excess of acetic anhydride in pyridine to give the diacetate.

*Example 10*

A mixture of 8 g. of 3α,11β-dihydroxy-6β-methyl-pregnan-20-one and 0.25 g. of platinum oxide in 100 ml. of ethanol and an excess of ethylamine is hydrogenated until the theoretical amount of hydrogen has been absorbed. Working up as in Example 1 gives the 20-ethylamino compound which (7 g.) is reacted with hypochlorite solution, irradiated in trifluoroacetic acid and reacted with alkali in succession as in Example 1 to give N-ethyl-3α,11β-dihydroxy-6β-methyl-5β-conanine which is oxidized with chromic oxide in glacial acetic acid to give the 3,11-dione.

This compound (1.5 g.) is reacted with ethyl iodide and then passed over an anion exchange resin to form the quaternary hydroxide as in Example 2. Heating the salt at 200° C. at 100 mm. gives 3,11-diketo-6β-methyl-18-dimethyl-amino-20-pregnene, which is quaternized with ethyl iodide. A solution of 1.5 g. of the thus formed ethoiodide in 200 ml. of dimethylformamide is heated with 2.0 g. of potassium ethoxide and heated at 100° C. for 30 minutes. The reaction mixture is then poured into 200 ml. of water, cooled and filtered to give 3,11-diketo-6β-methyl-12β,13β-methano-18-nor-20-pregnene. A mixture of 2.8 g. of the diketone, 2.5 g. of osmium tetroxide and 300 ml. of ether is reacted at 25° C. for 24 hours. The osmium ester is separated and decomposed with sodium sulfite in aqueous methanol by refluxing for 3 hours. The methylene chloride extract from the residue extraction gives 3,11-diketo-6β-methyl-12β,13β-methano-18-nor-pregnan-20,21-diol. This compound (0.8 g.) is diacetylated by reaction with 2 ml. of acetic anhydride in 3 ml. of pyridine. Quenching in water gives the diacetate.

*Example 11*

A stirring solution of 8.5 g. of 3,11-diketo-20,21-diacetoxy-12β,13β-methano-18-nor-allopregnane (Example 2) in 120 ml. of acetic acid is treated with 34 ml. of 1.79 M hydrogen bromide in acetic acid and then with 4.95 g. of bromine in 25 ml. of acetic acid. After 10 minutes the solution is poured into 1 l. of water and the solid dibromide separated by filtration. The solid dibromide is added to a suspension prepared by dissolving 4.44 g. of bromine in 42 ml. of acetone, adding 3.4 g. of sodium carbonate, stirring and filtering, then adding 40 g. of sodium iodide followed by a brief reflux period. The resulting mixture is stirred for 2.5 hours, then 7.4 g. of oxalic acid dihydrate is added followed by refluxing for one hour. Ethyl acetate (400 ml.) and water (1 l.) are added. The organic layer is washed with water, 5% sodium bicarbonate and water. It is then stirred with 70 g. of zinc dust and 2 ml. of acetic acid, filtered and washed again. The filtrate is evaporated to give a solid which is taken up in 80 ml. of ethanol and acidified with 6 ml. of acetic acid. After addition of 3 g. of Girard's Reagent "T," the solution is boiled for 30 minutes, cooled to 20° C., treated with 37% formaldehyde and allowed to stand for 25 minutes. It is extracted with ethyl acetate. The water layer is acidified to pH 1 and allowed to stand for two hours. It was extracted with ethyl acetate. The second ethyl acetate extract is washed, dried and evaporated to give 3,11-diketo - 20,21-diacetoxy-12β,13β-methano-18-nor-4-pregnene.

A solution of 6.0 g. of the pregnene in 500 ml. of methanol and 200 ml. of water containing 6 g. of potassium bicarbonate and 10 g. of potassium carbonate is allowed to stand at 25° C. for 18 hours. The solution is poured into water to give the free diol which (2.5 g.) is dissolved in 21 ml. of dioxane with 1.2 g. of dry pyridine and 1.4 g. of acetic anhydride. The mixture is kept at 25° C. for 60 hours then poured into water to separate the crude 21-acetate. This compound (15 mg.) in 1.7 ml. of acetate acid is reacted with 9 mg. of chromic acid in 0.17 ml. of acetic acid and 0.19 ml. of water. After one hour at 25° C., 0.1 ml. of ethanol is added and the reaction mixture quenched. The crystalline product is 21-acetoxy-12β,13β-methano-18-nor-4-pregnen-3,11,20-trione. Alternatively the free diol is dissolved in 100 ml. of pyridine; 1.5 g. of chlorotriphenylmethane is added and the mixture stirred for 72 hours at room temperature. Water is then added to give the crude 21-triphenylmethyl ether. Similar treatment with chromic acid gives the trione.

The acetate (4 mg.) is shaken in 5 ml. of methanol-water containing 10 mg. of sodium carbonate overnight. Quenching the mixture gives the desired 21-hydroxy-12β, 13β-methano-18-nor-4-pregnen-3,11,20-trione. Similarly refluxing the 21-triphenylmethoxy-12β,13β-methano-18-nor-4-pregnen-3,11,20-trione for 30 minutes with 80% acetic acid, followed by dilution with water, cooling, filtration, saturation of the filtrate with sodium chloride, extraction with chloroform and subsequent evaporation yields the 21-hydroxy compound.

*Example 12*

A solution of 2.8 g. of 3,11-diketo-12β,13β-methano-18-nor-allopregnan-20,21-diacetate in 150 ml. of tert.-butanol containing 1.5 ml. of glacial acetic acid is treated with 0.9 g. of selenium dioxide by refluxing for 24 hours under nitrogen. An additional 900 mg. of selenium dioxide is added and the reflux period repeated. The suspension is filtered and the filtrate evaporated. The filtrate residue is dissolved in ethyl acetate. The solution is washed with successive portion of 5% potassium bicarbonate solution, water, ammonium sulfide solution, cold 5% ammonium hydroxide solution, water, 1% hydrochloric acid and water. The residue from the washed extract is recrystallized to give 3,11-diketo-20,21-diacetoxy-12β,13β-methano-18-nor-1,4-pregnandiene. A solution of 3.0 g. of the pregnadiene in 300 ml. of aqueous methanol containing 6 g. of sodium carbonate is held at room temperature overnight. After quenching the desired diol is recovered. This compound (850 mg.) is dissolved in 8 ml. of dioxane along with 4 ml. of pyridine and 0.042 g. of acetic anhydride. After 12 hours, the mixture is quenched to give the monoacetate which (35 mg.) is oxidized in 2 ml. of acetic acid with 20 mg. of chromic acid in acid water solution. After 2 hours, a small amount of ethanol is added and the reaction mixture quenched. The crystalline product is 21-acetoxy - 12β,13β - methano-18-nor-1,4-pregnadien-3,11,20-trione.

*Example 13*

A mixture of 4.0 g. of 3,11-diketo-20,21-dipropionyloxy - 6α - fluoro - 12β,13β-methano-18-nor-allopregnane (Example 6) in 60 ml. of acetic acid is brominated with 17 ml. of 1.79 M hydrogen bromide and 2.5 g. of bromine in 15 ml. of acetic acid as described in Example 11. After dehydrobromination as described, the desired Δ⁴ compound is obtained. A mixture of 3.0 g. of 3,11- diketo-20,21-dipropionyloxy - 6α - fluoro - 12β,13β-methano-18-nor-4-pregnene in a solution of 350 ml. of aqueous methanol containing 3 g. of potassium bicarbonate and 5 g. of carbonate is reacted for 12 hours, then quenched to give the diol which (1.3 g.) is monoacetylated with 0.5 g. of acetic anhydride in pyridine. After quenching, the crude monoacetate (1.5 g.) is oxidized with 90 mg. of chromic acid in 2 ml. of acetic acid and 2 ml. of water. The quenched reaction mixture yields 21-acetoxy-6α-fluoro-12β,13β-methano - 18 - nor-pregnen-3,11,20-trione.

*Example 14*

20,21-diacetoxy - 3,11 - diketo-6β-methyl - 12β,13β-methano-18-norpregnane (2.7 g.) from Example 10 is dissolved in 35 ml. of dimethylformamide and treated with one molar equivalent of bromine in dimethylformamide dropwise until the bromine color persists. The monobromide obtained after quenching the mixture in water is heated with collidine to give 20,21-diacetoxy-3,11 - diketo - 6β - methyl-12β,13β-methano-18-nor-4-pregnene. A mixture of 2.0 g. of the diketone is hydrolyzed with sodium carbonate in aqueous ethanol. Quenching gives the diol which (0.8 g.) is reacted with 0.46 g. of acetic anhydride in 0.5 g. of pyridine and 20 ml. of dioxane. The reaction mixture is quenched after 24 hours to give the monoacetate. This compound (30 mg.) is oxidized with 18 mg. of chromic acid in 5 ml. of acetic acid. Quenching gives the desired α,β-mixture of 21 - acetoxy-6-methyl - 12β,13β - methano-18-nor-4-pregnen-3,11,20-triones. The acetate moiety is hydrolyzed by shaking 45 mg. of the mixture in dilute sodium carbonate solution with methanol to give the 21-ol. The 6α- and β-isomers are separated by chromatrographic separation over an alumina column.

Alternative treatment of the diol with chlorotriphenylmethane as described in Example 11 gives the corresponding 21-triphenylmethoxy analogues.

*Example 15*

A solution of 0.8 g. of the 2,4-dibromo derivative of 20,21-diacetoxy - 3,11 - diketo - 6β - methyl - 12β,13β-methano-18-norpregnane (prepared by brominating as in Example 14 but using two equivalents of bromine) in 15 ml. of collidine is heated at reflux for 30 minutes. Ether is added to the cooled mixture. The filtered ethereal extract is washed with dilute sulfuric acid, water and dried. The residue after evaporation of the solvent is purified by passing over a silicic acid column to give 20,21 - diacetoxy - 3,11 - diketo-6β-methyl - 12β,13β-methano-18-nor-1,4-pregnadiene. This compound (850 mg.) is hydrolyzed to the diol, monoacetylated or etherified with chlorotriphenylmethane and the 21-protected compound oxidized following the procedures described in Examples 11 and 14 to give the mixture of isomeric 21-acetoxy-6-methyl - 12β,13β - methano-18-nor-1,4-pregnadiene-3,11,20-triones which are similarly separated by chromatography.

*Example 16*

20,21 - diacetoxy - 3,11 - diketo - 16α-methyl-12β,13β-methano - 18 - norpregnane (2.8 g.) from Example 3 is brominated to give the 4-bromo derivative which is dehydrobrominated with collidine to give the Δ⁴ analogue which (1.2 g.) is hydrolyzed with alcoholic potassium carbonate to the diol, monoacetylated with one equivalent of acetic anhydride and oxidized with chromic acid in acetic acid as in Example 11 to give 16α-methyl-12β,13β-methano-18-nor-4-pregnen-3,11,20-trione.

Another portion (0.8 g.) of the 2,4-dibromo compound prepared by brominating the 4-monobromo compound with one molar equivalent of bromine as described above is reacted with 15 ml. of collidine at reflux for 45 minutes. After treatment with ether and purification of the product by silicic acid chromatography the diacetate of 16α - methyl - 12β,13β - methano-18-nor-1,4-pregnadien-20,21 - diol - 3,11-dione is obtained. This compound is hydrolyzed to the diol with carbonate, monoacetylated and oxidized with chromic acid to give 21-acetoxy-16α-methyl - 12β,13β - methano - 18-nor-1,4 - pregnadien-3,11,20-trione.

*Example 17*

A solution of 0.8 g. of the diacetate of 3,11-diketo-9α - fluoro - 12β,13β - methano - 18 - nor - allopregnan-20,21-diol (Example 7) in 30 ml. of acetic acid is brominated as described in Example 11 to give the dibromide which is dehydrohalogenated to give the 4-pregnene. This compound (1.0 g.) is hydrolyzed by shaking in 100 ml. of methanolic sodium carbonate, monoacetylated with one equivalent of acetic anhydride then oxidized with a slight excess of chromic acid in acetic acid to give 9α - fluoro - 21 - acetoxy - 12β,13β - methano-18-nor-4-pregnen-3,11,20-trione. The acetate (45 mg.) is shaken in 25 ml. of aqueous methanol with 100 mg. of sodium carbonate overnight to give the 21-hydroxy compound.

Alternative treatment of the diol with chlorotriphenylmethane as described in Example 11 yields the corresponding 21-triphenylmethyl ether.

*Example 18*

A stirred solution of 0.75 g. of the diacetate of 3,11-diketo - 12β,13β - methano - 18,19 - bisnor-allopregnan-20,21-diol of Example 8 is brominated in acetic acid by 3.4 ml. of 1.79 M hydrogen bromide solution and 0.5 g. of bromine to yield the 2,4-dibromide which is dehydrohalogenated with sodium iodide-hydriodic acid to the Δ⁴ compound, 1.0 g. of it is shaken with 100 ml. of alcoholic sodium carbonate solution to the diol, monoacetylated with 1 mole equivalent of acetic anhydride in pyridine and oxidized with chromic oxide in acetic acid as in Example 11 to yield 21-acetoxy-12β,13β-methano-18,19-bisnor - 4 - pregnen-3,11,20-trione. This compound (45 mg.) is shaken with sodium carbonate solution to give the 21-hydroxy compound. Alternatively the 21-triphenylmethoxy pregnane is oxidized to the 4-pregnene-3,11,20-trione as described in Example 11.

Similarly substituting the diacetate of 3,11-diketo-6α-fluoro - 12β,13β - methano - 18-19 - bisnor-allopregnan-20,21-diol (Example 8) in the above reaction sequence yields 21 - hydroxy - 6α - fluoro - 12β,13β - methano-18,19-bisnor-4-pregnen-3,11,20-trione.

*Example 19*

20,21 - diacetoxy - 3,11 - diketo-6β,9α-difluoro-12β,13β-methano-18-nor-allopregnane (1.6 g.) from Example 9 is brominated with hydrogen bromide-bromine to give the dibromo intermediate, then decomposed with sodium iodide hydriodic acid to the Δ⁴ compound. The acetyl groups are removed from this compound by treatment of 0.8 g. with methanolic sodium carbonate solution. The diol (0.6 g.) is acetylated with one mole equivalent of acetic anhydride in dioxane-pyridine and then oxidized with chromic oxide in acetic acid to give the desired 21-acetoxy - 6,9α - difluoro - 12β,13β-methano-18-nor-4-pregnen-3,11,20-trione mixture which is separated by alumina chromatography.

*Example 20*

The diacetate of 3,11-diketo-12β,13β-methano-18-norpregnan-20,21-diol (750 mg.) from Example 4 or 5 is brominated and dehydrobrominated to form the Δ⁴ compound, and then hydrolyzed, monoacetylated and oxidized as in Example 11 to form 21-acetoxy-12β,13β-methano-18-nor-4-pregnen-3,11,20-trione, identical with that formed in Example 11.

What is claimed is:

1. The method of preparing novel 12β,13β-methano-18-norsteroids having the following structural formula:

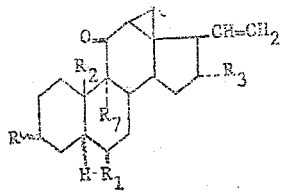

in which ⌇ is a configurational position selected from the group consisting of α and β; R is a member selected from the group consisting of hydroxy and keto; $R_1$ is a member selected from the group consisting of hydrogen, methyl and fluoro; $R_2$ and $R_3$ are members selected from the group consisting of hydrogen and methyl; and $R_7$ is a member selected from the group consisting of hydrogen and fluoro, which comprises reacting a quaternary salt of an 18-diloweralkyl-amino-11-keto steroid having the following structural formula:

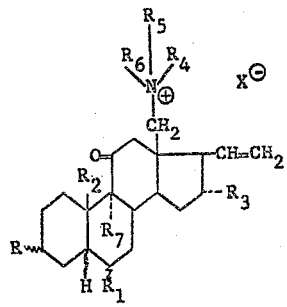

in which ⌇, R, $R_1$, $R_2$, $R_3$ and $R_7$ are as previously defined; $R_4$, $R_5$ and $R_6$ are lower alkyl having from 1–4 carbon atoms; and X⊖ is an inorganic anion capable of forming a stable quaternary salt, with an alkaline reagent selected from the group consisting of an alkali metal lower alkoxide, an alkali metal amide, an alkali metal hydride and an alkali metal hydroxide in a polar, strongly ionizing organic solvent in which the reactants are substantially soluble and with which the reactants are unreactive.

2. The method of claim 1 characterized in that the solvent is an anhydrous N,N-dimethylamide having 3 to 4 carbon atoms.

3. The method of claim 1 characterized in that the alkaline reagent is an alkali metal alkoxide having from 1 to 6 carbon atoms.

4. A chemical compound having the following structural formula:

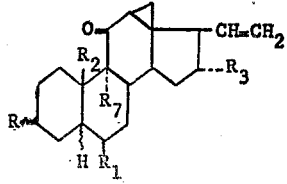

in which ⌇ is a configurational position selected from the group consisting of α and β; R is a member selected from the group consisting of hydroxy and keto; $R_1$ is a member selected from the group consisting of hydrogen, methyl and fluoro; $R_2$ and $R_3$ are members selected from the group consisting of hydrogen and methyl; and $R_7$ is a member selected from the group consisting of hydrogen and fluoro.

5. A chemical compound selected from the group consisting of compounds having the following structural formulas:

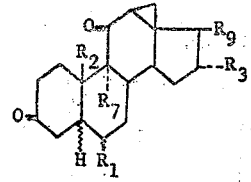

and

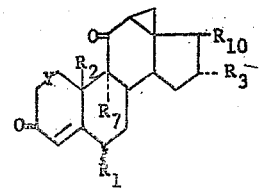

in which ⌇ is a configurational position selected from the group consisting of α and β; Y is a member selected from the group consisting of ethylene and vinylene; $R_1$ is a member selected from the group consisting of hydrogen, methyl and fluoro; $R_2$ is a member selected from the group consisting of methyl and, where Y is ethylene, hydrogen; $R_3$ is a member selected from the group consisting of hydrogen and methyl; $R_7$ is a member selected from the group consisting of hydrogen and fluoro; $R_9$ is a moiety selected from the group consisting of —CHOH—CH$_2$OH and —CHOAc—CH$_2$OAc in which Ac is a lower alkanoyl group having from 2 to 7 carbon atoms; and $R_{10}$ is a moiety selected from the group consisting of —CHOAc—CH$_2$OAc, —CHOH—CH$_2$OH
—CHOH—CH$_2$OR$_8$, —CO—CH$_2$OR$_8$ and
—CO—CH$_2$OH in which Ac is a lower alkanoyl group having from 2 to 7 carbon atoms, and $R_8$ is a member selected from the group consisting of lower alkanoyl having from 2 to 7 carbon atoms and triphenylmethyl.

6. 3β - hydroxy - 11 - keto-12β,13β-methano-18-nor-20-allopregnene.

7. 3,11 - diketo - 12β,13β-methano-18-nor-20-allopregnene.

8. 3,11 - diketo - 12β,13β-methano-18-nor-allopregnan-20-21-diol.

9. 3,11 - diketo-12β,13β-methano-18,19-bisnor-allopregnan-20,21-diol.

10. 21 - hydroxy-12β,13β-methano-18-nor-4-pregnen-3,11,20-trione.

11. 21 - acetoxy - 12β,13β-methano-18-nor-1,4-pregnadien-3,11,20-trione.

No references cited.